United States Patent [19]

Fujii

[11] Patent Number: 4,796,753

[45] Date of Patent: * Jan. 10, 1989

[54] CASING FOR MAGNETIC RECORDING MEDIUM AND PREPARATION THEREOF

[75] Inventor: Tatsuo Fujii, Saku, Japan

[73] Assignee: TDK Corporation, Tokyo, Japan

[*] Notice: The portion of the term of this patent subsequent to Nov. 26, 2002 has been disclaimed.

[21] Appl. No.: 839,534

[22] Filed: Mar. 14, 1986

[30] Foreign Application Priority Data

| Apr. 5, 1985 | [JP] | Japan | 60-51179[U] |
| Apr. 8, 1985 | [JP] | Japan | 60-74129 |
| Jan. 7, 1986 | [JP] | Japan | 61-000500[U] |
| Jan. 8, 1986 | [JP] | Japan | 61-001890 |

[51] Int. Cl.⁴ .................................. B65D 85/672
[52] U.S. Cl. ................................... 206/387; 156/277; 206/459; 428/204
[58] Field of Search ............. 40/2 R, 312; 206/387, 206/459; 428/35, 40, 42, 13, 204, 207, 500, 914; 156/277

[56] References Cited

U.S. PATENT DOCUMENTS

| 2,622,991 | 12/1952 | Sturm | 428/13 |
| 3,622,102 | 11/1971 | Fox | 206/387 |
| 3,967,022 | 6/1976 | Hasei | 428/204 |
| 4,048,736 | 9/1977 | Castleman et al. | 428/500 |
| 4,121,003 | 10/1978 | Williams | 428/42 |
| 4,289,817 | 9/1981 | Valyi | 428/35 |

FOREIGN PATENT DOCUMENTS

| 2518297 | 6/1983 | France | 206/387 |
| 1320092 | 6/1973 | United Kingdom . | |

*Primary Examiner*—Jimmy G. Foster
*Attorney, Agent, or Firm*—Oblon, Fisher, Spivak, McClelland, Maier

[57] ABSTRACT

A casing for magnetic recording medium has a laminated structure in which a printed plastic film is bonded on one surface of a raw plastic sheet.

2 Claims, 8 Drawing Sheets

CASING FOR MAGNETIC RECORDING MEDIUM AND PREPARATION THEREOF

The present invention relates to a casing for magnetic recording medium to accommodate magnetic recording goods such as a magnetic tape cassette, a floppy disk and so on.

There have widely been used magnetic tape cassette, floppy disks and so on as magnetic recording medium which can be placed on a driving device (a magnetic recordingreproducing device) or can be removed from it for storage or transportation purpose. Each of the magnetic tape cassette or the floppy disk contains a magnetic tape or a magnetic disk to avoid deposition of dust or damage of the surface of the magnetic recording medium, which causes faulty signals in the recording and reproducing operation of the magnetic recording medium. Accordingly, it is necessary to put the magnetic tape cassette or the floppy disk in a container or a box to protect it from damage when it is in non-use. There has been made consideration on the container in such a manner that the magnetic tape cassette should be protected in the container during storage and transportation until the magnetic tape cassette is possessed by a user, and after the user possesses the magnetic tape cassette, it should be easily put in and removed from the container when the magnetic tape cassette is used.

Paper or a plastic material has been used to prepare the container. In a case that the container is made of the plastic material, a blank (incomplete container) is made of a raw plastic sheet (base sheet), and then the blank is subjected to a non-clear treatment using printing method of a lattice pattern, colored stripes, a trademark, symbols and so on, on its outer surface except for transparent windows through which the inside of the magnetic tape cassette is visible.

In order to form the blank, there are a raw plastic sheet manufacturing step (the first step), a printing step (the second step), and a punching.pressing.hot stamping step (the third step). Accordingly, a box-making step in which the blank is set by a bending operation into a box-like shape is the final step. In such operations, several days are required for aging for each time between the first and second steps and between the second and third steps. Usually, the above-mentioned steps are respectively taken by separate companies at separate places, and therefore, products processed at one place have to be transported to the other place. Such transportation is required several times until a complete container is obtained.

In the process for preparing a container, however, there are many manufacturing steps; thus necessitating transportation of incomplete container between a step and the subsequent step, whereby it is inavoidable that there take place faults such as flaws in the products. This causes poor efficiency in production of the container.

When printing is applied to a surface of the raw plastic sheet which constitutes the outer surface of the container, cost of the printing, especially, selection of ink is an important factor. Since an inked layer formed by the printing is directly exposed to the atmosphere, consideration should be taken so as not to suffer adverse effect from the atmosphere. For this purpose, an expensive thermosettable ink having heat-resistance and wear-resistance properties has been used. Further, a protection layer 10 has been formed by coating varnish on the printed surface as shown in FIG. 2 in order to prevent the printed surface from contamination when the container has been treated in the subsequent step immediately after the printing step.

In FIG. 2, a reference numeral 12 designates the above-mentioned raw plastic sheet, a numeral 14 designates a printed layer, a numeral 16 designates a foil layer formed by a hot stamping operation and a numeral 18 designates an embossed surface. Nevertheless, blocking in which the printed ink deposits on the surface of another blank is inavoidable because a fairly large pressure is applied between the blanks when a number of blanks are piled up. Accordingly, it is essential to consider selection of an ink and the blocking. In the conventional method, the necessity of the aging after the first or second step derives from use of the ink having thermosetting characteristic. Namely, the aging after the first step is to minimize change in the shape of the raw plastic sheet and elongation and contraction of the sheet caused by a heating treatment for drying and curing of the ink in the printing step (i.e. the second step), whereby good print-finished product can be obtained. Further, in the aging after the second step, it is necessary to take a sufficient time so that the inked layer and a surface protecting layer become stronger and peeling off of the ink can be prevented is used.

It is an object of the present invention to provide a casing for magnetic recording medium and the preparation of the casing in which a blank being inexpensive, allowing easy selection of an ink and unnecessitating consideration of blocking is used.

According to an aspect of the present invention, there is provided a casing for magnetic recording medium having a laminated structure in which a printed plastic film is bonded on one surface of a raw plastic sheet.

In accordance with another aspect of the present invention there is provided a process for preparing a casing for magnetic recording medium characterized by a step of forming a raw plastic sheet from a molten plastic material, a step of bonding a printed plastic film on one surface of the raw plastic sheet to form a laminated sheet, a step of punching and stamping the laminated sheet to obtain a blank, and a step of bending the blank in a box form.

In the drawings:

FIG. 1 is an enlarged side view of a part of a blank of an embodiment of the present invention as shown in FIG. 10, in which

Figure 3:
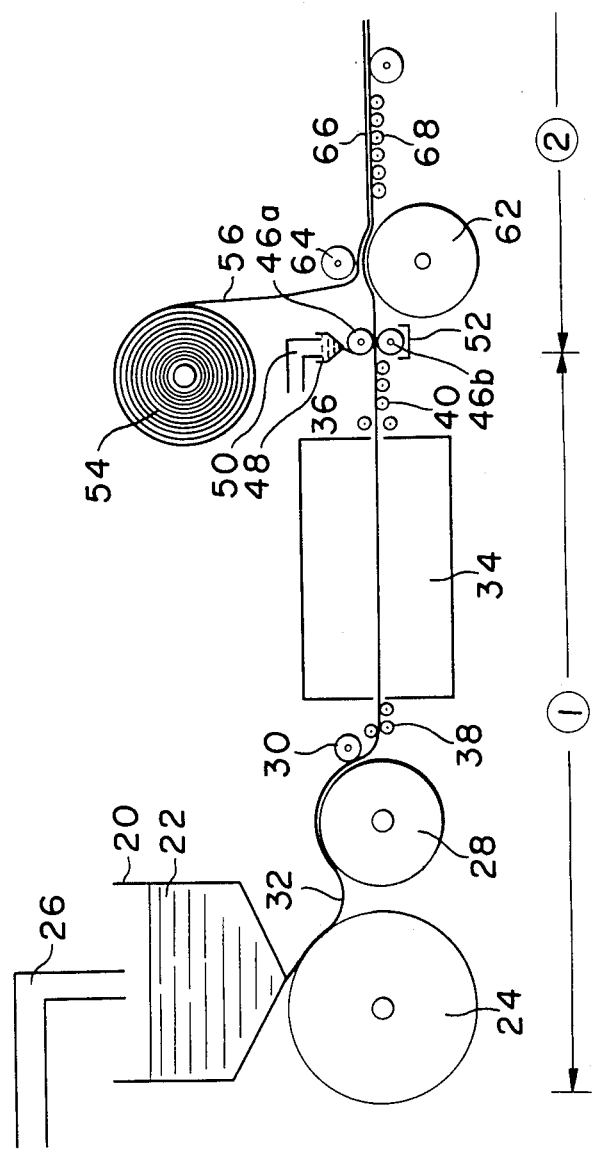
FIGS. 3 and 4 are diagrams showing steps of manufacturing a blank according to an embodiment of the present invention.
Figure 4:
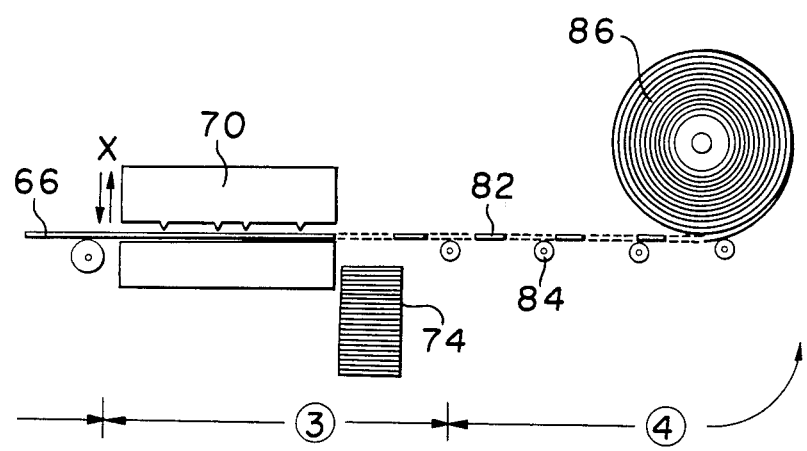
Figure 12:
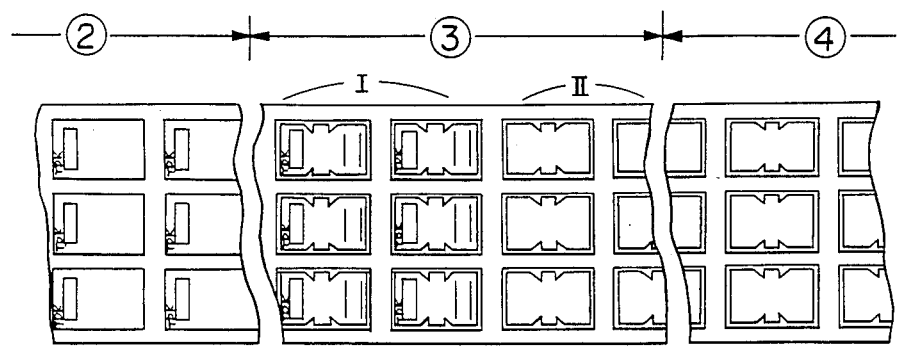
Figure 13:
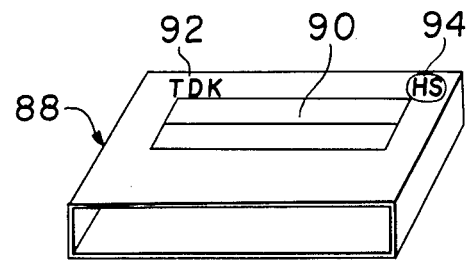
Figure 14:
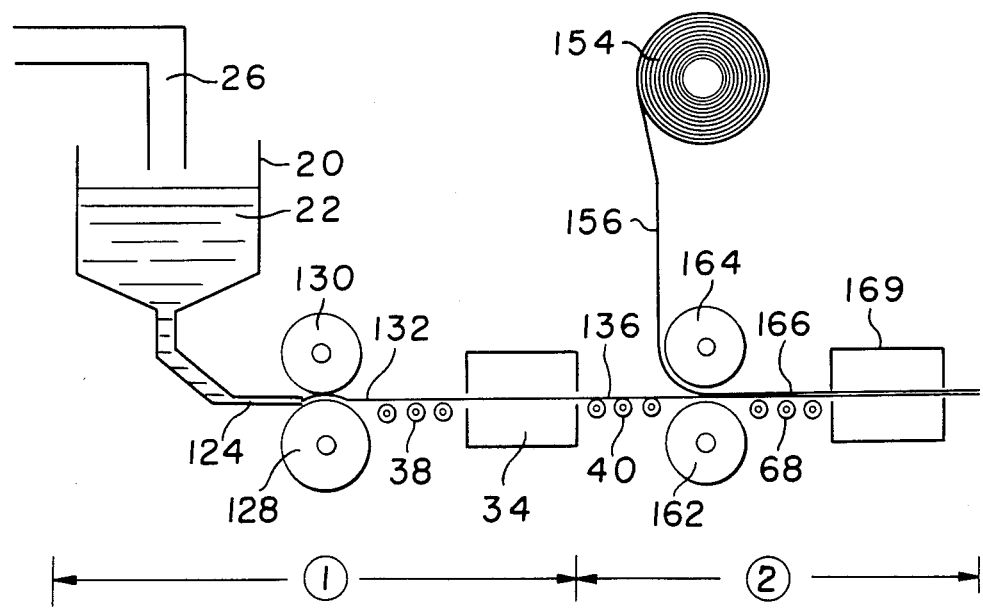

FIG. 12 is a diagram showing a process of punching-pressing and stamping operations of the laminated plastic plate formed by the manufacturing step as shown in FIGS. 3 and 4; and FIG. 13 is a perspective view of a casing for a video magnetic tape cassette of an embodiment of the present invention; and FIG. 14 is a diagram showing steps for manufacturing a blank according to another embodiment of the present invention.

Preferred embodiments of the present invention will be described with reference to the accompanying drawings.

First of all, description will be made as to a process for preparing a blank for a casing for a video magnetic tape cassette in accordance with the present invention.

FIGS. 3 and 4 are respectively diagrams showing the entire steps for manufacturing the blank. In FIGS. 3 and 4, a reference numeral 20 designates a hopper for storing a transparent or a semitransparent material for a raw plastic sheet, such as polypropylene resin (PP) 22. Besides polypropylene resin, polyester, polycarbonate, or polyvinyl chloride is preferably used as the transparent or the semitransparent material for the raw plastic sheet. A reference numeral 24 designates a heat roller placed below the hopper 20 for receiving the plastic material. The plastic material in a molten state is distributed from a lower outlet of the hopper 20 onto the circumferential surface of the roller. A reference numeral 26 designates a feeding pipe for feeding a raw plastic material when the molten plastic material in the hopper 20 decreases. An emboss roller 28 and a nip roller 30 having a mirror surface are located in a pair. The transparent plastic sheet 32 supplied from the heat roller 24 in semi-dried condition is received on the circumferential surface of the emboss roller 28, and then the transparent plastic plate 32 is clamped by pressing the nip roller 30. The emboss roller 28 to be contacted with one surface of the flat plate 32 has a mirror surface part at a position corresponding to a predetermined portion including a transparent window as an observing part which is formed in the inner surface area of the blank; lattice-like ribs at a position corresponding to lattice-like grooves which are formed in the inner surface area; and minutely roughened surface part to be formed in spaces between the lattice-like ribs. These parts are preferably formed two or more in number in the emboss roller 28 in its axial direction so that two or more blanks can be obtained at the same time. The nip roller 30 having a mirror surface which is in contact with the other surface of the flat plate 32 has a mirror surface part in the entire circumferential surface of the roller. The nip roller 30 exerts a pressing force on the circumferential surface of the emboss roller 28 through the flat plate 32 of a transparent plastic material so that the flat plate 32 is continuously forwarded while the surface of the flat plate 32 in contact with the nip roller 30 is mirror-surface-finished. The flat plate 32 of the transparent plastic material has one surface (the front surface) which is mirror-surface-finished in the entire surface region and the other surface (the rear surface) on which the mirror surface part and the lattice-like ribs are formed, and the flat plate 32 is dried in a drying section 34. Thus the first step ① as a step of manufacturing the raw plastic sheet 36 is finished. There are a number of small rollers 38, 40 are placed at the front and rear of the drying section 34 to support and forward the flat plastic plate 32 and the raw plastic sheet 36.

Figure 5:
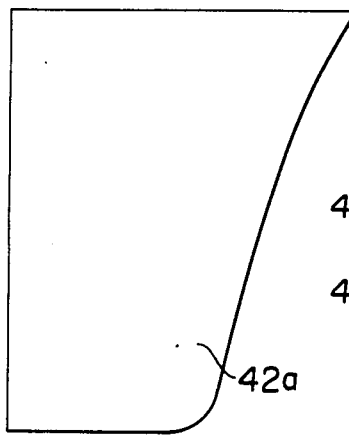
FIG. 5A is a plan view showing the surface side of a raw plastic sheet obtained by the manufacturing steps as shown in FIGS. 3 and 4.
FIG. 5B is a plan view of the rear side of the raw plastic sheet.
Figure 5:
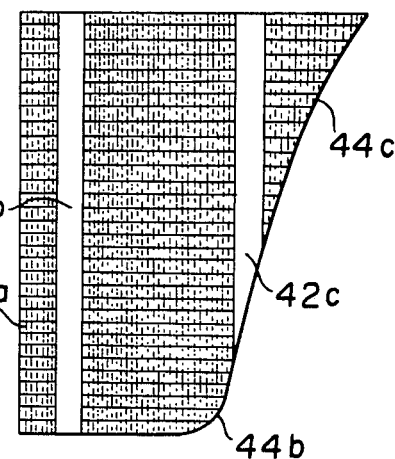
Figure 6:
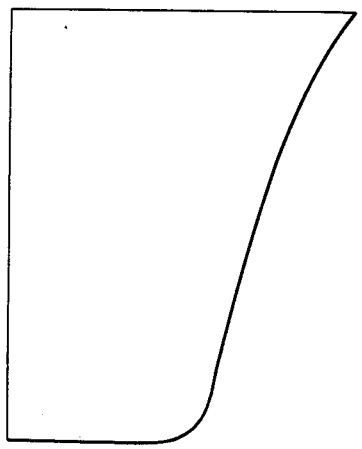
FIG. 6A is a plan view of the rear side of another raw plastic sheet obtained by the manufacturing steps as shown in FIGS. 3 and 4.
FIG. 6B is a plan view showing the rear side of the raw plastic sheet.
Figure 6:
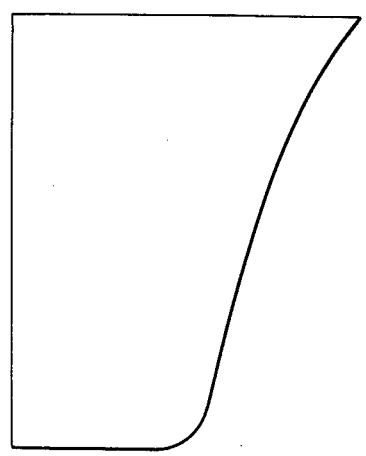

FIG. 5 shows the raw plastic sheet manufactured by the first step ① in which FIG. 5A is a plan view of the front side of the sheet and FIG. 5B is a plan view of the rear side of the sheet. In FIG. 5, reference numerals 42a-42c designate the mirror surface parts and numerals 44a-44c designate the lattice-like embossed parts. For the emboss roller 28, a mirror surface roller may be placed. In this case, the raw plastic sheet having both surfaces which are mirror-surface-finished can be obtained as shown in FIGS. 6A and 6B.

When the raw plastic sheet 36 is further forwarded, the sheet 36 is sandwiched between a pair of sizing rollers 46a, 46b where a sizing operation is carried out on the front side surface (the mirror surface) for the raw plastic sheet 36. A reference numeral 48 is a glue hopper which storages a glue such as a plastic glue and feeds it on the circumferential surface of the upper roller 46a, and a numeral 50 designates a feeding pipe for feeding the glue when the glue in the hopper 48 decreases. A numeral 52 designates a tray for receiving the glue dropping from the sizing roller 46b and so on, and a numeral 54 designates a film roller on which a transparent plastic film such as polypropylene film 56 is wound. The film is printed with a lattice pattern, colored stripes, a trademark, symbols, indications and a desired design at positions except for the transparent window as the observing part. Use of the plastic film 56 provides the advantage that it is unnecessary to carry out printing operation on the thick flat plastic plate. The printing operation on the thin film is easy and reduces the manufacturing cost.

Figure 7:
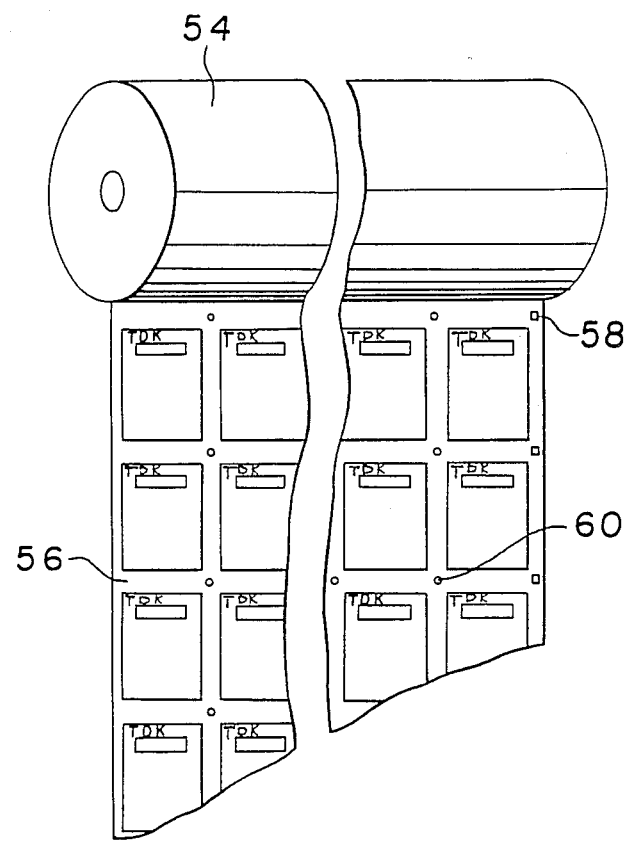
FIG. 7 is a diagram showing a state of feeding a printed plastic film used for the manufacturing steps as shown in FIGS. 3 and 4.

FIG. 7 shows how the plastic film is forwarded and processed. In FIG. 7, a reference numeral 58 designates a position-aligning mark by which the raw plastic sheet 36 is aligned with one edge of the film 56. Each of the marks 58 is formed at each laterally printed line before blank-cutting operations. A reference numeral 60 designates marks arranged vertically and laterally, which are used for position-aligning for cutting and stamping operations. The marks 60 are formed at each printed line before cutting operations. A numeral 62 designates a pressing roller and a numeral 62 a pressing nip roller. They are paired to cooperate in such a manner that the raw plastic sheet 36 after its mirror surface has been glued is received on the circumferential surface of the pressing roller 62 and then, the printed plastic film 56 attached to the glued surface is pressed by the pressing nip roller 64. In this case, the sheet 36 and the film 56 may be compressed together in a state either directing the printed surface of the film 56 to the glued surface of the raw plastic sheet 36, or directing the printed surface of the film 56 outside of the sheet 36. Thus, the laminated plate 66 consisting of the raw plastic sheet 36 and the printed plastic film 56 is formed, and the second step ② as a step of manufacturing laminated plastic plate 66 is finished. A number of small-sized supporting rollers 68 are provided in the rear of the pressing roller 62 to support and forward the laminated plastic plate 66.

Figure 8:
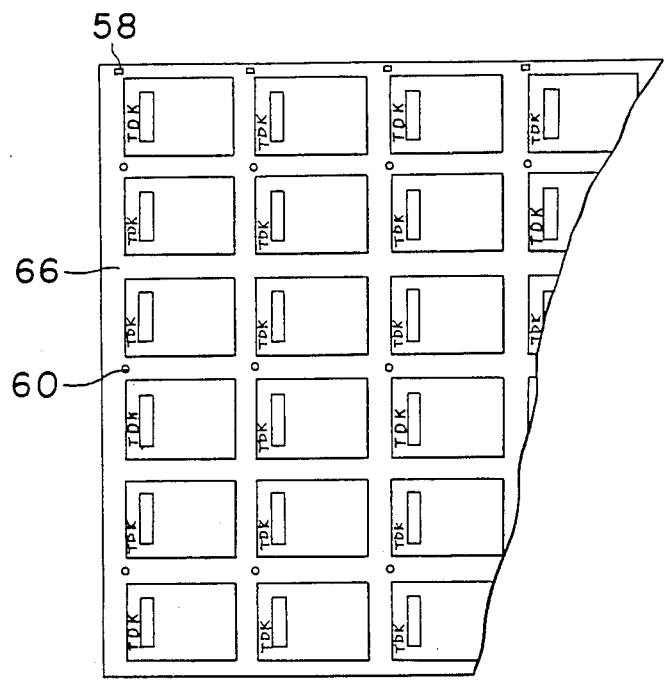
FIG. 8 is a plan view of a laminated plastic plate before cutting of the blank obtained by the manufacturing steps as shown in FIGS. 3 and 4.
Figure 9:
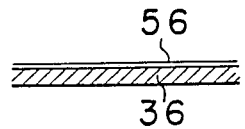
FIG. 9 is a cross-sectional view of the laminated plastic plate.

FIG. 8 is a plan view of the laminated plastic plate produced in the second step ②, and FIG. 9 is a side view of a part of the laminated plastic plate.

Figure 10:
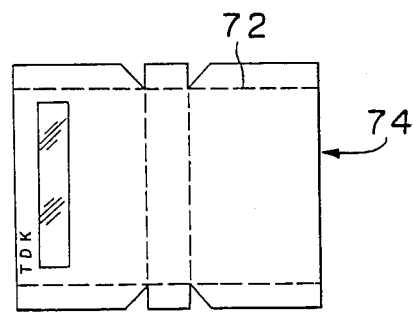
FIG. 10 is a plan view of the blank formed by the manufacturing steps as shown in FIGS. 3 and 4.

The laminated plastic plate 66 is further forwarded to a punching and pressing device 70 where it is punched by a suitable punching metal and then, is subjected to heat-pressing along the dotted line 72 to form grooves. The grooves allows easy fabrication of a blank 74 by bending the laminated plastic sheet 66 at the grooved portions (FIG. 10). In FIG. 4, arrow marks with X indicate the directions of movement of an upper metal mold. Then, the punched blank 74 is forwarded from the punching and pressing device 70, and the third step ③ as the final step of manufacturing the blank is finished.

Figure 1A:
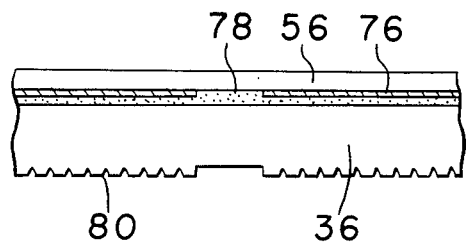
FIG. 1A shows a plastic film whose printed surface is included inside the blank.
Figure 1B:
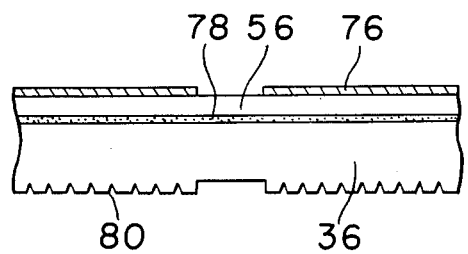
FIG. 1B shows the plastic film whose printed surface is exposed on the blank.
Figure 2:
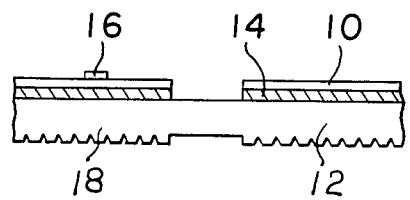
FIG. 2 is an enlarged side view of a blank used for a container for magnetic recording medium.

FIG. 10 is a plan view of the blank manufactured in the third step ③. FIG. 1 is an enlarged side view of a part of the blank in which FIG. 1A shows a state that the printed plastic film is bonded to the raw plastic sheet with its printed surface directing inside and FIG. 1B shows a state that the printed surface of the film is directed outside of the plastic sheet. In FIG. 1A, a reference numeral 76 designates a printed layer in the printed surface of the plastic film 56, and a numeral 78 designates a glue layer interposed between the film 56 and the raw plastic sheet 36. A reference numeral 80 designates a lattice-like embossed surface in the raw plastic sheet 36. In FIG. 1B, the printed layer appears at the outer surface of the blank because the other surface without being printed of the film 56 is bonded to the raw plastic sheet 36. Thus obtained laminated structure of the blank 74 in which the printed plastic film 56 is bonded to one surface of the raw plastic sheet allows the printed surface to be included inside the blank or the printed surface to be exposed on the front surface of the blank. Accordingly, it is possible to widely select an ink for printing. When the printed surface is included in the blank, a quick-drying ink can be used whereby cost for printing is reduced and aging as required in the conventional method is not needed. Further, the plastic film 56 constitutes a protecting layer for the printed surface. Accordingly, an additional protecting layer is not needed and the blocking can be avoided even though a number of blank 74 are stacked.

Figure 11:
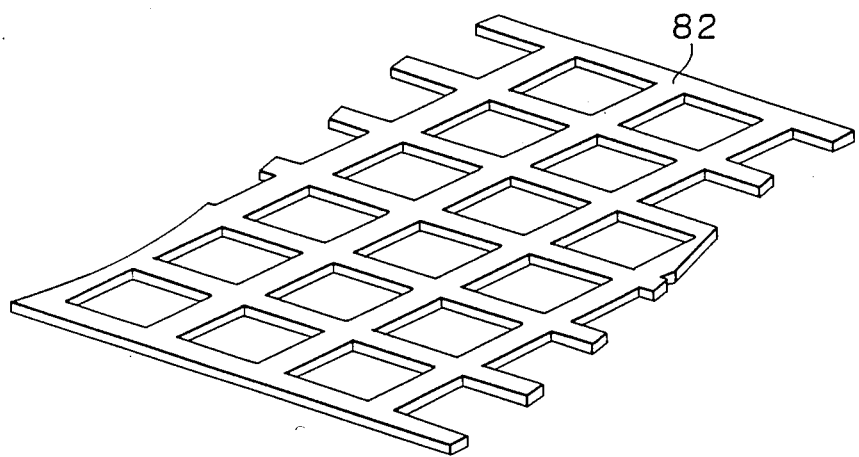
FIG. 11 is a perspective view showing a part of the laminated plastic plate after the cutting operation.

A punched sheet 82 as a scrap, i.e. the laminated plastic plate 66 from which blanks 74 are punched, is further forwarded to a roller 86 to be wound around it by means of supporting rollers 84. The fourth step ④ is to wind the punched sheet on the winding roller 86. FIG. 11 is a perspective view showing a part of the punched plastic plate. FIG. 12 is a plan view showing a process starting from the second step for producing the laminated plastic plate and ending at the fourth step for winding the punched laminated plate.

FIG. 13 is a perspective view of a completed container obtained by passing a blank through the above-mentioned steps followed by bending, setting and bonding the blank as shown in FIG. 10. In FIG. 13, a reference numeral 88 designates the container used for a video magnetic tape cassette, a numeral 90 designates a transparent window of an observing portion of the interior of the container, a numeral 92 printed letters such as a tradename, and a numeral 94 designates a letter mark formed by a vapour deposition method. When the container 88 is prepared by the laminated plastic plate in which the printed surface of the plastic film 56 is included in the blank, the printed letters 92 and the letter mark 94 formed by the vapour deposition method are visible from the outer surface of the container through the transparent plastic film 56. When the container 88 is prepared by the laminated plastic plate in which the printed surface of the plastic film is directed outside, the printed letters and the letter marks directly appear on the plastic film 56. Thus, the outer surface of the container 88 displays a pattern of design, letters and symbols such as a trademark which are formed by printing and vapour deposition methods, while the outer surface is kept in a smooth condition. When the inner surface of the container undergoes an opaque treatment such as formation of the lattice-like embossing treatment, the inner surface provides an appropriate frictional force to a magnetic tape cassette held inside it to thereby prevent coming off the cassette. The container prepared by the above-mentioned steps increases efficiency in production because the number of manufacturing steps can be reduced and the several steps can be continuously carried out. Also, the cost of manufacture of the container can be reduced.

Thus, in the above-mentioned embodiment, the blank 74 has a laminated structure in which the printed plastic film 56 is bonded to one surface of the raw plastic sheet 36. Accordingly, the printed surface of the plastic film 56 is included in the blank or is exposed outside the blank, with the result that wide selection of an ink is possible. When the printed surface is included in the blank, an ink having quick-drying properties can be used whereby the cost for printing is reduced and aging as required in the conventional method is no longer required. Further, blocking is completely prevented even though a number of blanks are piled.

In the next place, another embodiment for preparing a container for video magnetic tape cassette of the present invention will be described with reference to FIG. 14.

In FIG. 14, the same reference numerals as in FIGS. 3 and 4 designate the same parts and accordingly, description of these parts is omitted.

The hopper 20 is provided at its lower part with a conduit 124 for supplying continuously molten plastic material to be distributed at the outlet port. A reference numeral 128 designates an emboss roller and a numeral 130 designates a nip roller having a mirror surface. The both rollers are placed in a face-to-face relation. The molten plastic material continuously extruded from the outlet of the conduit 124 is received on the circumferential surface of the emboss roller 128 and the molten plastic material is pressed by the nip roller 30 incorporated with the emboss roller 128 whereby a flat plastic plate 132 is formed. The emboss roller 128 has a mirror surface part, lattice-like ribs and minutely roughened surface parts on its outer circumferential surface as has the emboss roller 28 as shown in FIG. 3. These parts are formed in a group and two or more groups are formed in the emboss roller 128 in the axial direction of the roller whereby two or more blank can be obtained at once. The nip roller 130 has the mirror surface part at the entire peripheral surface region of it. Accordingly, when the flat plastic plate 132 is pressed by the both rollers, the surface in press-contact with the nip roller 130 is mirror-surface-finished. Then, the flat transparent plastic plate 132 having the mirror surface at the one side (front surface) and the mirror surface part and the lattice-like embossed parts at the other surface (the rear surface) is introduced in the drying section 34. On completion of the drying operation, the first step ① as a step for manufacturing a raw plastic sheet 136 is finished. In this case, the thickness of the raw plastic sheet is preferably in the range from 400 μm to 1000 μm.

At the downstream side of the drying section 34, there is provided a film roller 154 which is placed above the passage of the flat plastic plate 132. On the film roller 154, a printed plastic film, e.g. polypropylene film 156 of the same material as the raw plastic sheet 136 is wound. The printed plastic film may be either an expanded plastic film or a non-expanded plastic film. The plastic film is printed with a lattice-like pattern, colored stripes, a tradename, symbols and so on and is applied with an indication or a design formed by a vapour deposition method and so on at positions except for a transparent window as a part of observation. In this case, an ink having compatibility with the plastic film 156 and the raw plastic sheet 136 is used.

A heat pressing roller 162 and a nip roller for heat pressing 164 are located in face-to-face relation. The raw plastic sheet 136 produced by passing the beforementioned step is forwarded to the heat pressing roller 162 and at the same time the printed plastic film 156 is supplied on one surface of the raw plastic sheet 136. The overlaid plastic film 156 and the raw plastic sheet 136 is passed in the space between the heat pressing roller 162 and the nip roller 164 whereby they are heat-bonded together by utilizing heat in the raw plastic sheet 136 in addition to a compression force. Alternately, the plastic materials may be heated by the both rollers 162, 164. In heat bonding of the plastic materials, the printed surface of the plastic film 156 is faced to one surface of the raw plastic sheet 136. In this case, a preferable heat bonding can be obtained by applying on the printed surface of the film an anchor coating layer compatible with the raw plastic sheet 136, before heat bonding. It is possible that the surface without the printing layer of the plastic film 156 is directed to one surface of the raw plastic sheet 136 so as to heat-bond together. Thus, a laminated plastic plate 166 consisting of the raw plastic sheet 136 and the printed plastic film 156 and having an uniform thickness can be obtained. Besides the method utilizing a pair of rollers for heat bonding, another desirable method such as use of a high-frequency heating furnace can be employed. A reference numeral 169 designates a cooling section which takes excessive heat from the laminated plastic plate 166 whereby the shape and structure of it becomes stable. Thus, the second step 2 as a step of manufacturing the laminated plate 166 is completed. Then, the laminated plate 166 is further forwarded to the punching and pressing device 70 similar to that shown in FIG. 4. The steps for fabricating a container are the same as those described with respect to the first embodiment and therefore, description is omitted.

In the above-mentioned second embodiment, the raw plastic sheet having a thickness of 400 μm to 1000 μm is used and the printed plastic film 156 of the same material as the raw plastic sheet is bonded on one surface of the sheet to form a laminated structure. In this case, the printed surface can be included inside the blank or can be exposed on the surface of the blank. Accordingly, it is possible to widely select an ink. In a case that the printed surface is included inside the blank, a quick-drying ink can be used, whereby the cost of printing can be reduced and aging as required in the conventional method is no longer required. Further, blocking can be completely prevented even though a number of blanks are stacked.

In the second embodiment, the printed plastic film 156 is heat-bonded on the one surface of the raw plastic sheet 136 whereby an intermediate layer such as an adhesive agent is not needed. Namely, by employing heatbonding method, the raw plastic sheet 136 having a thickness of 400 μm to 1000 μm is directly bonded to the plastic film 156 of the same material as the raw plastic sheet. In addition, an ink compatible to the sheet and film is used. Accordingly, heat-bonding is easily carried out by utilizing waste heat from the raw plastic sheet 136 and by simply pressing the both plastic materials or by pressing them with application of a small amount of heat. With such method, a laminated plastic sheet having a uniform thickness can be easily obtained. In the second embodiment, a troublesome adhesive coating step which is difficult in application of a uniform coating layer can be eliminated.

I claim:

1. A casing for magnetic recording medium having a laminated structure in which a printed plastic film is bonded on one surface of a raw plastic sheet of the same material with its printed surface directing outside and wherein an anchor coating layer compatible with said raw plastic sheet is formed on said printed plastic film, wherein the inner surface of the casing has been modified by a lattice-like embossing treatment.

2. A casing for magnetic recording medium according to claim 1, wherein said printed plastic film has a surface printed with an ink compatible with said raw plastic sheet.

* * * * *